United States Patent
Religa et al.

(10) Patent No.: US 11,714,791 B2
(45) Date of Patent: Aug. 1, 2023

(54) AUTOMATED GENERATION OF REVISION SUMMARIES

(71) Applicant: Microsoft Technology Licensing, LLC, Redmond, WA (US)

(72) Inventors: Tomasz Religa, Seattle, WA (US); Max Wang, Seattle, WA (US); Huitian Jiao, Redmond, WA (US); Ravi Mandliya, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 17/335,749

(22) Filed: Jun. 1, 2021

(65) Prior Publication Data

US 2022/0382728 A1 Dec. 1, 2022

(51) Int. Cl.
*G06F 16/21* (2019.01)
*G06N 20/20* (2019.01)
*G06F 40/197* (2020.01)

(52) U.S. Cl.
CPC .......... *G06F 16/219* (2019.01); *G06F 40/197* (2020.01); *G06N 20/20* (2019.01)

(58) Field of Classification Search
CPC ...... G06F 16/219; G06F 40/197; G06N 20/20
USPC ........................................ 707/608
See application file for complete search history.

(56) References Cited

U.S. PATENT DOCUMENTS

| | | | | |
|---|---|---|---|---|
| 8,949,242 | B1 * | 2/2015 | Lin | G06F 16/36 707/739 |
| 9,959,296 | B1 * | 5/2018 | Gubin | G06F 16/219 |
| 10,402,481 | B2 * | 9/2019 | Simons | G06F 3/005 |
| 10,698,957 | B1 * | 6/2020 | Sacks | H04L 67/306 |
| 10,769,365 | B2 | 9/2020 | Fern et al. | |
| 10,896,161 | B2 * | 1/2021 | Dontcheva | G06F 40/197 |

(Continued)

FOREIGN PATENT DOCUMENTS

WO WO 2020/096803 A1 * 5/2020 ............. G06Q 10/10

OTHER PUBLICATIONS

Shinde, Pramila P., et al., "A Review of Machine Learning and Deep Learning Applications", ICCUBEA 2018, Pune, India, Aug. 16-18, 2018, 6 pages.*

(Continued)

*Primary Examiner* — Robert Stevens
(74) *Attorney, Agent, or Firm* — Talem IP Law, LLP

(57) ABSTRACT

Technologies are provided for automated generation of revision summaries for an electronic document. In some embodiments, a computing system can determine that a first section of a first version of the electronic document includes changes relative to a second section of a second version of the electronic document. The second section corresponds to the first section. The computing system also can generate respective descriptions of the first section and the second section. The computing system can then generate a summary of the changes by comparing the respective descriptions. The computing system can determine that the summary has a defined placement in a ranking of similarity scores, where a first similarity score in the ranking defines similarity between the respective descriptions. The computing system can add metadata to the first version of the electronic document. The metadata controls presentation of a visual element indicative of the summary within a user interface.

20 Claims, 11 Drawing Sheets

(56) References Cited

U.S. PATENT DOCUMENTS

| | | | | |
|---|---|---|---|---|
| 2012/0109905 | A1* | 5/2012 | Tingstrom | G06F 40/154 |
| | | | | 707/E17.127 |
| 2013/0174032 | A1* | 7/2013 | Tse | G06F 40/106 |
| | | | | 715/273 |
| 2018/0189369 | A1* | 7/2018 | Baek | G06F 40/197 |
| 2018/0285326 | A1* | 10/2018 | Goyal | G06F 16/288 |
| 2019/0286741 | A1 | 9/2019 | Agarwal et al. | |
| 2019/0392057 | A1* | 12/2019 | Denoue | G06F 40/106 |
| 2020/0162561 | A1 | 5/2020 | Milvaney et al. | |
| 2020/0264745 | A1 | 8/2020 | Fox et al. | |
| 2020/0349225 | A1* | 11/2020 | Agrahari | G06F 40/284 |
| 2021/0365773 | A1* | 11/2021 | Subramanian | G06F 40/20 |
| 2022/0269884 | A1* | 8/2022 | Walters | G06F 40/205 |

OTHER PUBLICATIONS

Maass, Dustin, "Data Mining Revision Controlled Document5 History Metadata for Automatic Classification", UWM Digital Commons, The University of Wisconsin-Milwaukee, Master of Science in Computer Science Thesis, Dec. 2013, 29 pages.*

"International Search Report and Written Opinion Issued in PCT Application No. PCT/US22/27963", dated Aug. 30, 2022, 10 Pages.

Lewis, et al., "BART: Denoising Sequence-to-Sequence Pre-Training for Natural Language Generation, Translation, and Comprehension", In Repository of arXiv:1910.13461v1, Oct. 29, 2019, 10 Pages.

* cited by examiner

Monday, 12:56 PM Pacific Time
■ Max Wang modified

Minor changes were made in 1 paragraphs

Monday, 12:05 PM Pacific Time — 310
■ Tomasz Religa modified — 320                 — 330

Section in document was added to mention that in the series of posts on artificial intelligence, we have shown how we can use machine learning. Also, minor changes were made to two paragraphs

Monday, 11:36 PM Pacific Time
■ Tomasz Religa modified

Minor changes were made in 1 paragraphs

AUTOMATED GENERATION OF REVISION SUMMARIES

BACKGROUND

Numerous computer platforms can provide a collaborative editing experience for the creation of electronic documents. Those platforms permit multiple authors to create an electronic document concurrently or in a sequence of editing events. The electronic document can thus be referred to as a shared document and a current version of the shared document can result from multiple revisions made by the multiple authors. A shared document created in that fashion can leverage a range of expertise and insight from the multiple authors, thus yielding a quality, more comprehensive work product compared to an electronic document that is individually created by one or few authors.

The editing events that create a shared document can be asynchronous, which can make it difficult for an author to keep track of what changes have been made by the time the author revisits the shared document. Although a document revision history may be available to the multiple authors, accessing the document revision history can be resource intensive. As the size of the shared document and/or the number of revisions increase, the amount of network bandwidth utilized to access the computing platform may increase. Thus, the editorial process may be hindered by network congestion and/or other issues. Further, it also can be time consuming (if not plain infeasible) to individually inspect each change and determine changes made to the shared document. Not only can a lengthy review of the shared document be impractical, but it also can result in increased use of computing resources at the computing platform. The greater the number of authors accessing the shared document simultaneously can result in increased number of processor cycles and increased access to cache storage, for example.

The foregoing issues may be exacerbated in cases where revisions are created automatically, without any user-annotated information. Even when a computing platform permits the insertion of revision summaries for an electronic document being authored by several end-users, those summaries are seldom inserted or typically fail to be informative.

Accordingly, much remains to be improved in technologies that provide revision summaries for an electronic document.

BRIEF SUMMARY

Technologies are provided for automated generation of revision summaries for an electronic document. A revision summary includes a natural-language description of changes made to the electronic document. To generate a revision summary, in some embodiments, a computing system can operate on a first version and a second version of the electronic document. The computing system can determine that a first section in the first version of the document includes changes relative to a corresponding second section in the second version of the electronic document. The computing system can then generate a description of the first section by applying a machine-learning model to text in the first section. The computing system also can generate a description of the second section by applying the machine-learning model. Each of those descriptions can characterize, in natural language, respective content included in the first section and second section. Because the first section includes changes, differences amongst the description of the first section and the description of the second section can convey the nature of the changes. Thus, the computing system can generate a summary of the changes by at least comparing the description of the first section and the description of the second section.

Depending on the scope of a revision to the electronic document, the computing system can generate multiple revision summaries for respective sections of the first version of the electronic document. Many of the changes that are summarized can be minor, such as correction of typographical errors or small formatting changes (e.g., removal of a stray marking in an itemized list). Thus, the computing system can generate a ranking of the changes in terms of level/degree of similarity amongst a revised version of a section and a prior version of the same section. The ranking can be arranged in order of significance, with summaries revealing more expansive changes placed near the top of the ranking. Hence, the computing system can select one or several summaries having defined placements near the top of the ranking in order to capture summaries that represent revisions of greater scope. The computing system can then add metadata identifying the selected summaries to the revised version of the electronic document. The metadata can cause presentation of visual elements identifying the selected summaries in response to the accessing the revised version of the electronic document. In this way, the computing system can eliminate minor revisions from being presented at a user device, focusing instead on presentation of more meaningful revisions.

Implementation of the technologies disclosed herein can provide several improvements over conventional technologies for creation of shared documents. For example, implementation of the disclosed technologies can provide quick access to an overview of the changes made to a shared document, and can permit straightforward navigation to meaningful revisions in situations where the shared document has been significantly edited. Accordingly, implementation of the disclosed technologies can reduce the usage of network bandwidth and cached storage, and/or can reduce function calls to a computer platform by reducing an amount of time that a user device maintains a connection to identify changes made to a shared document relative to a prior version of the shared document.

It is noted that the above-described subject matter can be implemented as a computing system, a computer-implemented method, computer-controlled apparatus, or as an article of manufacture, such as a computer-readable storage medium. These and various other features will be apparent from a reading of the following Detailed Description and a review of the annexed drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

BRIEF DESCRIPTION OF THE DRAWINGS

FIG. 6 illustrates an example of a fragment of a user interface that presents aspects of revisions to an electronic document, in accordance with one or more embodiments of the disclosure.

FIG. 7 illustrates another example of a user interface that presents aspects of revisions to an electronic document, in accordance with one or more embodiments of the disclosure.

DETAILED DESCRIPTION

Figure 1:
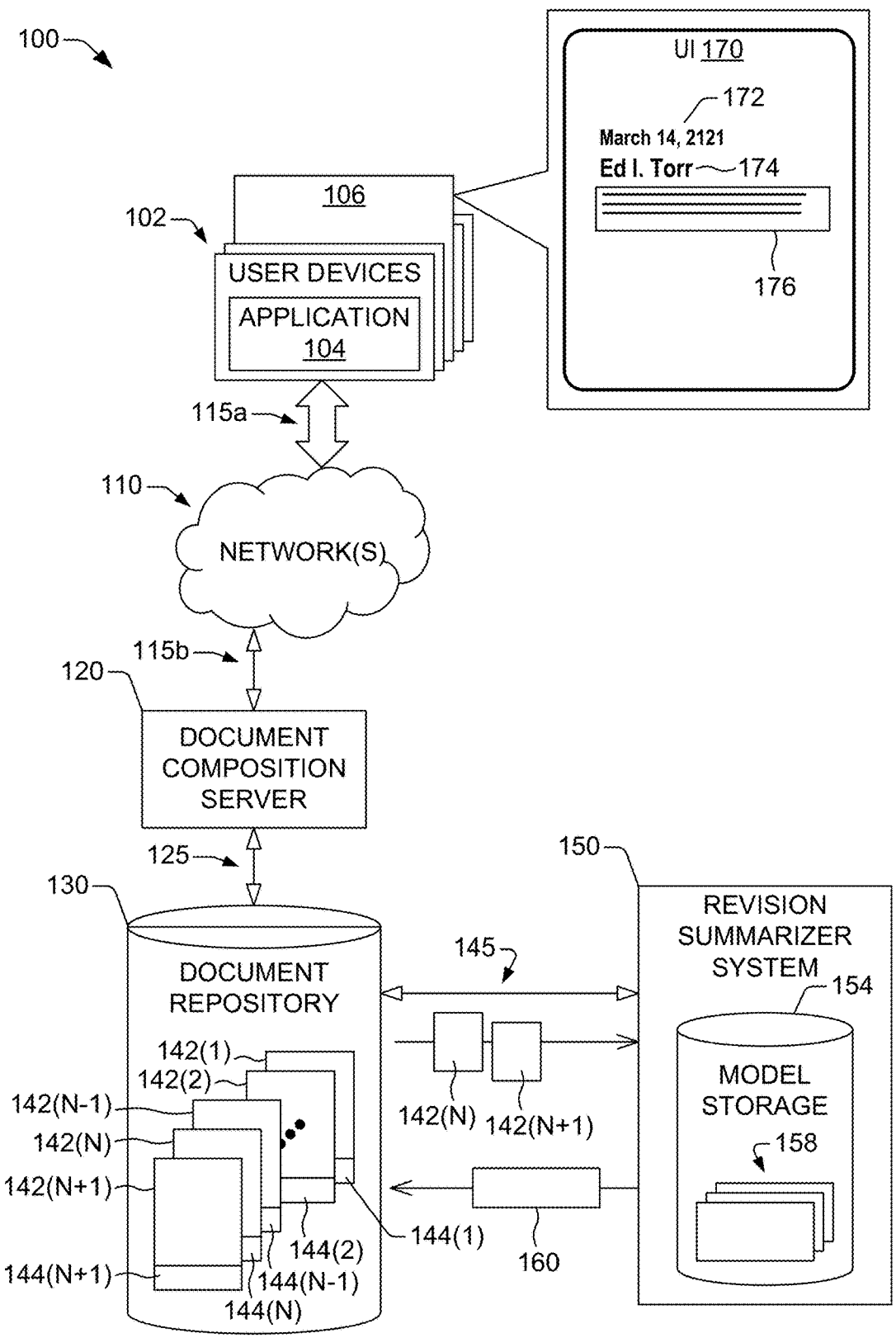
FIG. 1 illustrates an example of an operational environment for automated generation of revision summaries, in accordance with one or more embodiments of the disclosure.

This disclosure recognizes and addresses, among other technical challenges, the lack of informative summaries of revisions made to an electronic document. As is described in greater detail below, embodiments of the disclosure provide natural-language revision summarizes that characterize at least some of the changes made to a shared document authored across multiple user devices. By transforming metadata pertaining to the shared document, the presentation of one or several revision summaries at a user interface (UI) can be controlled. The metadata also can permit focusing the presentation of revised content within that user interface. As a result, in sharp contrast with commonplace technologies, meaningful information characterizing changes to a shared document can be made available and also can be efficiently accessed.

Depending on the scope of a revision to the electronic document, the computing system can generate multiple revision summaries for respective sections of the first version of the electronic document. Many of the changes that are summarized can be minor, such as correction of typographical errors or small formatting changes (e.g., removal of a stray marking in an itemized list). Thus, the computing system can generate a ranking of the changes in terms of level/degree of similarity amongst a revised version of a section and a prior version of the same section. The ranking can be arranged in descending order, with summaries revealing more expansive changes placed near the top of the ranking. Hence, the computing system can select one or several summaries having defined placements near the top of the ranking in order to capture summaries that represent revisions of greater scope. The computing system can then add metadata identifying the selected summaries to the revised version of the electronic document. The metadata can cause presentation of visual elements identifying the selected summaries in response to the accessing the revised version of the electronic document. In this way, the computing system can eliminate minor revisions from being presented at a user device, focusing instead on presentation on more meaningful revisions.

Implementation of the technologies disclosed herein can provide several improvements over conventional technologies for creation of shared documents. For example, implementation of the disclosed technologies can provide quick access to an overview of the changes made to a shared document, and also can permit straightforward navigation to meaningful revisions in situations where the shared document has been significantly edited. Accordingly, implementation of the disclosed technologies can reduce the usage of network bandwidth and cached storage, and/or can reduce function calls to a computer platform by reducing an amount of time that a user device maintains a connection to identify changes made to a shared document relative to a prior version of the shared document. Indeed, through implementations of the embodiments described herein, processor cycles, memory, and network bandwidth, amongst other computing resources, may be used more efficiently than in conventional computing system. Other technical benefits not specifically mentioned herein can also be realized through implementations of the disclosed subject matter.

FIG. 1 illustrates an example of an operational environment 100 for automated generation of revision summaries, in accordance with one or more embodiments of the disclosure. In the exemplified operational environment 100, multiple user devices 102 can edit a particular electronic document. The particular electronic document can be referred to as shared document, and the multiple user devices 102 can collaboratively author the particular electronic document by means of asynchronous and/or synchronous events. To that end, each one of the multiple user devices 102 has a particular amount of computing resources (e.g., processing resources, memory resources, networking resources, and I/O elements) that can permit editing the particular electronic document. More specifically, each one of the multiple user devices 102 can include an application 104. Simply for purposes of illustration, the application 104 can be embodied in one of a content processing application within a suite of utility applications, a mobile application, or a client application (such as a web browser). In some cases, the multiple user devices 102 includes can be homogeneous, including devices of a particular type, such as desktop computers or high-end to medium-end mobile devices (laptops, tablet computers, or similar). In other cases, the group of user device 102 can be heterogeneous, including devices of a various types, such as a combination of desktop computers and high-end to medium-end mobile devices.

During execution, the application 104 can cause a user device (e.g., user device 106) to present a composition environment (not depicted in FIG. 1) that permits editing the particular electronic document. In some cases, the composition environment can be embodied in, or can include, a UI having multiple panes that include a first pane where content of the electronic document can be presented. The multiple panes also can include a second pane having a group of selectable visual elements. Selection of one of those elements can permit accessing functionality that permits formatting the content of the shared document. For purposes of illustration, content refers to digital content that can include text, tables, lists, figures or other types of images, media, or similar content.

One or several server devices 120 (referred to as document composition server 120) can provide the composition environment and associated functionality. At least one of the multiple user devices 102 that edits the shared document can be functionally coupled to the document composition server 120 by one or several networks 110 that permit one-way and/or two-way communication of data and/or signaling. The network(s) 110 can include at least one wireless network, at least one wireline network, or a combination of wireless network(s) and wireline network(s). Suitable communication links 115a functionally couple the multiple user devices 102 to the network(s) 110, and other suitable communication links 115b functionally couple the network(s) 110 to the document composition server 120. A suitable communication link can include at least one wireless link, at least one wireline links, or a combination thereof. That user device can send, to the document composition server 120, data and/or signaling defining edits to the shared document via the network(s) 110.

The document composition server 120 can receive that type of data and/or signaling from at least one of the multiple user devices 102. The document composition server 120 can then update a current version of the shared document according to those edits, using the data and/or signaling. Updating the current version of the shared document includes creating the current version or modifying the current version. The document composition server 120 can retain the current version of the shared document in one or more memory devices 130 (referred to as document repository 130).

Historical edits to the shared document can result in multiple versions of the shared document. The document composition server 120 can retain some or all of the versions of the shared documents in the document repository 130. To at least that end, the document composition server 120 is functionally coupled to the document repository 130 by suitable communication links 125, such as wireless links and/or wireline links (represented by two-way open arrows in FIG. 1). A number of versions retained in the document repository 130 can be dictated by a group of retention rules. For purposes of illustration, a current version 142(N+1) of a shared document and multiple prior versions of the shared document—including a first prior version 142(1), a second prior version 142(2), and so forth up to an N-th prior version 142(N)—are shown as being retained in the document repository 130. Here, N is a natural number greater than unity.

The exemplified operational environment 100 also includes a revision summarizer system 150 functionally coupled to the document repository 130 by suitable communication links 145, such as wireless links and/or wireline links (represented by two-way open arrows in FIG. 1). The revision summarizer system 150 that can generate one or several summaries of respective changes present in a first version of a shared document relative to a second version of the shared document. To generate a summary of changes, the revision summarizer system 150 can obtain the first version and the second version of the shared document. As an illustration, the first version can be a current version of the shared document (e.g., current version 142(N+1)) and the second version can be the immediately prior version of the shared document (e.g., N-th prior version 142(N). As such, as is shown in FIG. 1, the revision summarizer system 150 can obtain the current version 142(N+1) and the N-th prior version 142(N).

Figure 2:
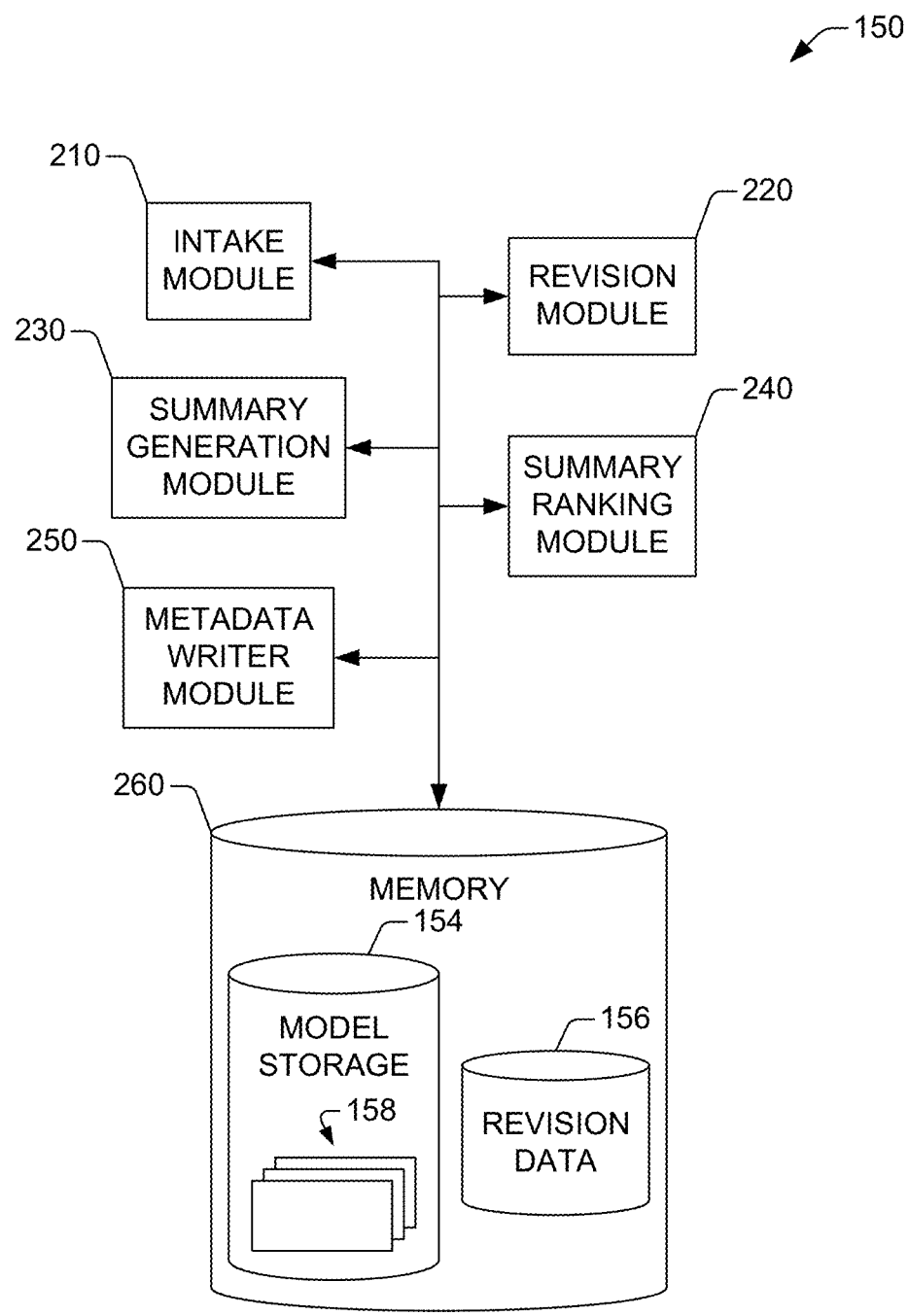
FIG. 2 illustrates an example of a revision summarizer system for automated revision summaries, in accordance with one or more embodiments of the disclosure.

The revision summarizer system 150 can obtain a version of the shared document in numerous ways. In some configurations, the revision summarizer system 150 can obtain a version of the shared document by sending a query message (not depicted in FIG. 1) including a version identifier (ID) that pertains to the version of the shared document. In response, the document composition server 120 can send a response message including payload data defining the version of shared document. Further, the revision summarizer system 150 can obtain another version of the shared document by sending a second query message (not depicted in FIG. 1) including a second version ID that pertains to the other version of the shared document. Again, in response to the second query message, the document composition server 120 can send the other version of the shared document to the revision summarizer system 150. In some embodiments, as is illustrated in FIG. 2, the revision summarizer system 150 can include an intake module 210 that can obtain versions of a shared document in accordance with aspects described herein.

First and second versions of the shared document need not be obtained in a particular order. Indeed, in some cases, the revision summarizer system 150 can obtain the current version 142(N+1) and the N-th prior version 142(N) essentially concurrently. In other cases, the revision summarizer system 150 can obtain a version of the shared document as the shared version becomes available at the document repository. In such cases, the document composition server 120 can send the version of the shared document to the revision summarizer system 150 after that version of the share document has been retained in the document repository 130.

The revision summarizer system 150 can then operate on the first version of the shared document and the second version of the shared document. The revision summarizer system 150 can operate on the first and second versions of the shared documents in a pipelined fashion, where multiple operation stages are implemented in sequence, with a subsequent operation stage using data generated in a current operation stage. Specifically, in an initial operation stage the revision summarizer system 150 can apply a pattern matching technique (such as Gestalt pattern matching algorithm) to align the first version of the shared document and the second version of shared document paragraph-wise. As a result, identical or highly similar paragraphs can be paired together, and other paragraphs that that have been added or removed can be recorded. Accordingly, the revision summarizer system 150 can retain various types of revision data. For example, the revision data can include first data indicative of paragraph(s) that have been added to the shared document. In addition, or in some cases, the revision data can include second data indicative of paragraph(s) that have been removed from the shared document. In some embodiments, the revision summarizer system 150 can include a revision module 220 (FIG. 2) that can apply the pattern matching technique to mutually align the first version of the shared document and the second version of the mutual document. The revision module 220 also can retain revision data 156 within one or more memory devices 260 (referred to as memory 260).

In a next stage, the revision summarizer system 150 can identify sections in each one of the first version of the shared document and the second version of the shared document. To identify a section in a particular version of the shared document, the revision summarizer system 150 can determine a content type of a portion of the particular version the shared document by applying a first machine-learning model to the shared document. The first machine-learning can solve a multi-category classification task, where a first category of multiple categories defines a first content type, a second category of the multiple categories defines a second content type, a third category of the multiple categories defines a third content type, and so forth.

Accordingly, determining the content type can include generating a first classification attribute identifying the content type. The first classification attribute can be embodied in a tag or another type of label, for example. The first classification attribute that is generated can be one of multiple defined section names. The revision summarizer system 150 can then assign the first classification attribute (e.g., a first tag) to a section name of the section in the particular version of the shared document. The revision summarizer system 150 also can assign the portion of the particular version of the shared document to the section. Depending on the structure of the particular version of the shared document, the revision summarizer system 150 can identify multiple sections, each one being assigned a particular section name and having a particular amount of content (e.g., text, tables, lists, figures or other types of images, media, or similar content). It is noted that, in some cases, the sections identified by the revision summarizer system 150 can be independent of the underlying section names defined by an author of the shared document. In other cases, the revision summarizer system 150 can rely on user-identified headings (such as Word Styles in Microsoft® Word® or Wikipedia headings) as a template for identification of sections.

In some cases, the output of the first machine-learning model can be a binary classification defining whether a section break exists between portions (such as paragraphs) of a version the shared document. The section break can indicate that a section is present. In response, application of the first machine-learning model to the version of the shared documents can result in generation of a section name using a multi-category classifier from the multiple defined section names. In other cases, the first machine-learning model can apply one of several sequence-to-sequence approaches to determine the section name.

The first machine learning model can be retained in one or more memory devices 154 (referred to as model storage 154). The model storage 154 can retain multiple sets of parameters, the sets defining respective machine-learning models 158. Thus, a first set of parameters defines the first machine-learning model. In some embodiments, the first machine-learning model can be embodied in a deep neural network (DNN). Thus, the first set of parameters can be arranged in one or many data structures, each representing a layer of the DNN. The first set of parameters can be determined by training the machine-learning model 158 using labeled datasets of training data. Such datasets can include, for example, a large number of electronic files, each having one or more portions of content labeled according to content type. Training the first machine-learning model includes determining a solution to an optimization problem with respect to a prediction error of the first machine-learning model. Such a solution provides the first set of parameters that defines the first machine-learning model.

As a result of the identification of sections in each one of the first version of the shared document and the second version of the shared document, the revision summarizer system 150 can add section names in each one of the first version of the shared document and the second version of the shared document. The revision summarizer system 150 can then match a section in the first version of the shared document to another section in the second version of the shared document. To that end, the revision summarizer system 150 can traverse a set of first classification attributes (e.g., tags) of the first version of the shared document, associating a first portion of content in that first version to a second portion of content in the second version of the shared document. The first portion and the second portion have respective classification attributes (e.g., tags) that are the same or otherwise satisfy a defined matching criterion.

By matching sections in the first version of the shared document to sections in the second version of the shared document, the revision summarizer system 150 can determine differences amongst corresponding sections in those versions of the shared document. Because the first version of the shared document and the second version of the shared document have been aligned, the revision summarizer system 150 can readily dismiss paired paragraphs that lack changes in one of those versions relative to the other one. The revision summarizer system 150 can then use remaining unpaired paragraphs within one or more sections in the first version of the shared document to determine that changes are present in the first version of the shared document relative to the second version of the shared document. Thus, the revision summarizer system 150 can determine that a first section of the first version of the shared document includes changes relative to a second section of the second version of the shared document, where the second section corresponds to the first section. The changes can include at least one of addition of text, deletion of text, addition of an image, deletion of an image, a punctuation change, or a format change. More specifically, the revision summarizer system 150 can identify first unpaired paragraphs that constitute the first section and second unpaired paragraphs that constitute the second section. The revision summarizer system 150 can then determine differences between content in the first section and second content in the second section. Those differences include the changes amongst the first and second sections.

The revision summarizer system 150 can use a classification attribute (e.g., a tag) that identifies the first section in the first version of the shared document and the second section in the second version of the shared document to provide a marker for location within the shared document where changes are present.

In a further next stage in the pipeline of operations, the revision summarizer system 150 can generate a summary of the changes present in the first section of the first version of the shared document relative to the corresponding second section in the second version of the shared document. More specifically, the revision summarizer system 150 can generate a description of the first section by applying a second machine-learning model to first text in the first section, and also can generate a description of the second section by applying the second machine-learning model to second text in the second section. The second machine learning model also can be retained in the model storage 154), where a second set of parameters defines the second machine-learning model. The revision summarizer system 150 can then compare the description of the first section and the description of the second section to generate the summary of the changes. In some embodiments, the revision summarizer system 150 can include a summary generation module 230 (FIG. 2) that can generate the summary of changes as is described herein. That is, the summary generation module 230 can apply the first machine-learning model to versions of a shared document and also can apply the second machine-learning model to text in corresponding sections of respective versions of the shared document. In addition, the summary generation module 230 also can generate the summary of the changes by comparing respective descriptions of a section in a first version of the shared document and a corresponding section in a second version of the shared document.

In some embodiments, the second machine-learning model also can be embodied in a DNN. Thus, the second set of parameters can be arranged in one or many data structures, each representing a layer of the DNN. The second set of parameters can be determined by training the second machine-learning model using labeled datasets of training data. Such datasets can include, for example, a large number of electronic files, each having text passages in natural language that have been labeled according to a particular meaning. Training the second machine-learning model includes determining a solution to an optimization problem with respect to a prediction error of the second machine-learning model. Such a solution provides the second set of parameters that defines the first machine-learning model.

More specifically, in some cases, the DNN that constitutes the second machine-learning model can embody a sequence-to-sequence model that generates paragraph summary. For example, the second machine-learning model can be embodied in a bidirectional and autoregressive transformer (BART) summarizer. The BART summarizer is a denoising autoencoder for pretraining sequence-to-sequence models, and has machine-translation architecture that includes a bidirectional encoder (such as bidirectional encoder representations from transformers (BERT)) and a left-to-right decoder (such as a generative pretrained transformer (GPT)). This disclosure, however, is not limited in that respect, and other types of high-quality deterministic summarizers (or comprehension models) can embody the second machine-learning model.

In some cases, based on revisions made to an extant version of the shared document, the revision summarizer system 150 can generate multiple revision summaries for changes in respective sections of the shared document. Some changes may be minor and other changes may be major. Thus, the revision summarizer system 150 can rank the multiple revision summaries in terms of the scope of the changes to the respective sections. To the end, the revision summarizer system 150 can generate respective similarity scores for the multiple revision summaries, each score defines a level of similarity between a first description of a section in the first version of the shared document and a second description of the section in the second version of the shared document. The revision summarizer system 150 can generate the similarity score for a summary of changes by evaluating a similarity function that receives the first description and the second description of the section as arguments. Various similarity functions can be used. For instance, the similarity function can include one of cosine similarity, Minkowski similarity, Manhattan similarity, or Jaccard similarity. The revision summarizer system 150 can order the respective similarity scores in ascending order to generate a ranking of the multiple revision summaries. A top-ranked revision summary can represent the largest scope of changes. That is, a section corresponding to the top-ranked revision summary may have been modified the most relative to a prior version of the shared document. As is shown in FIG. 2, in some embodiments, the revision summarizer system 150 can include a summary ranking module 240 (FIG. 2) that can generate similarity scores for respective summaries in accordance with aspects described herein. The summary ranking module 240 (FIG. 2) also can generate the ranking of multiple similarity scores.

The revision summarizer system 150 can then update metadata pertaining the first version of the shared document to include data 160 indicative of the top-ranked summary. To update such metadata, the revision summarizer system 150 can augment the metadata with the data 160. In a case the first version of the shared document is embodied in the current version 142(N+1) of the shared document, the revision summarizer system 150 can update the metadata 144(N+1) to add the data 160. The added data 160 controls the presentation of a visual element identifying the summary of the changes. In some embodiments, the revision summarizer system 150 can include a metadata writer module 250 (FIG. 2) that can generate the data 160 and can augment the metadata pertaining to the first version of the shared document.

A user device 106 within the multiple user devices 102 can execute the application 104 to access the current version 142(N+1) of the shared document. In response to accessing that version of the shared document, the application 104 can access the updated metadata 144(N+1) and can then generate a user interface 170 using, at least partially, the updated metadata 144(N+1). The user interface 170 that can be generated includes a visual element 176 identifying the top-ranked summary of the summaries of changes present in the current version 142(N+1) of the shared document. In further response to accessing that version of the shared document, the application 104 can cause a display device (not depicted in FIG. 1) of the user device 106 to present the user interface 170. Presenting the user interface 170 can include presenting the visual element 176.

The updated metadata 144(N+1) also can include data defining a timestamp of the revision of the N-th prior version 142(N) of the shared document that resulted in the current version 142(N+1) of the shared document. The updated metadata 144(N+1) can further include data defining a username of an author of the revision. Accordingly, in some cases, the user interface 170 also can include a second visual element 172 that identifies the timestamp, and a third visual element 174 that identifies the username. Just for the sake of illustration, the timestamp and the username are shown in FIG. 1 as "Mar. 14, 2121" and "Ed I. Torr," respectively. The timestamp can be formatted according to one of many formats.

Figure 3A:
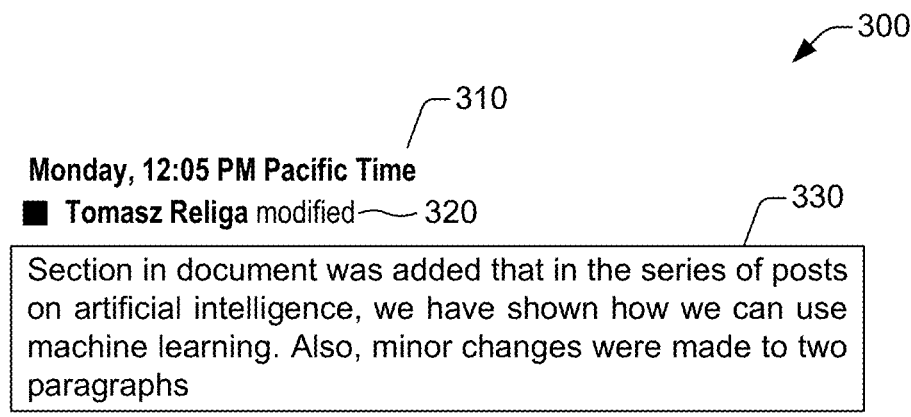
FIG. 3A illustrates visual elements that present aspects of a revision to an electronic document, in accordance with one or more embodiments of the disclosure.

As further illustration, FIG. 3A presents an example of visual elements 300 that present aspects of a revision to a shared document, in accordance with one or more embodiments of the disclosure. The visual elements 300 include a first visual element 310 that identifies a timestamp of a revision to an extant version of the shared document and a second visual element 320 that identifies a username of an author of the modification. The visual elements 300 also include a third visual element 330 that includes text identifying a summary of changes to the revision. The text can be presented in natural language and according to a defined template. To that point, the data 160 can include formatting information indicative of the template.

Figure 3B:
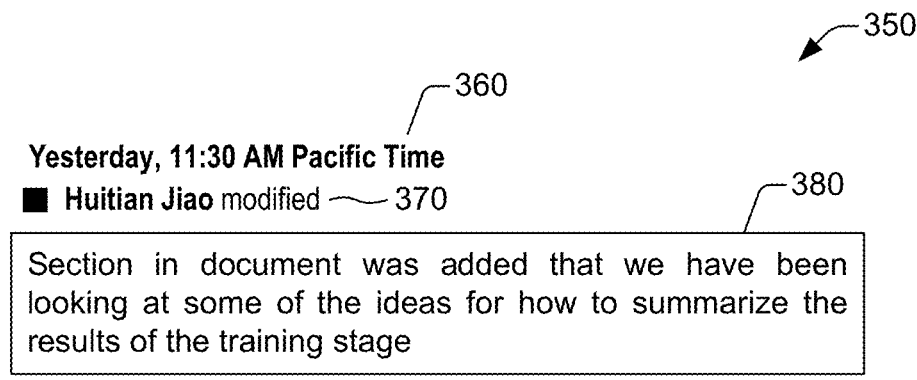
FIG. 3B illustrates visual elements that present aspects of a revision to an electronic document, in accordance with one or more embodiments of the disclosure.

In addition, FIG. 3B presents an example of visual elements 350 that present aspects of another revision to the shared document electronic document, in accordance with one or more embodiments of the disclosure. The visual elements 350 include a first visual element 360 that identifies a timestamp of a revision to an extant version of the shared document, and a second visual element 370 that identifies a username of an author of the modification. The visual elements 350 also include a third visual element 380 that includes text identifying a summary of the revision. Again, the text can be presented in natural language and according to a defined template.

Figure 4:
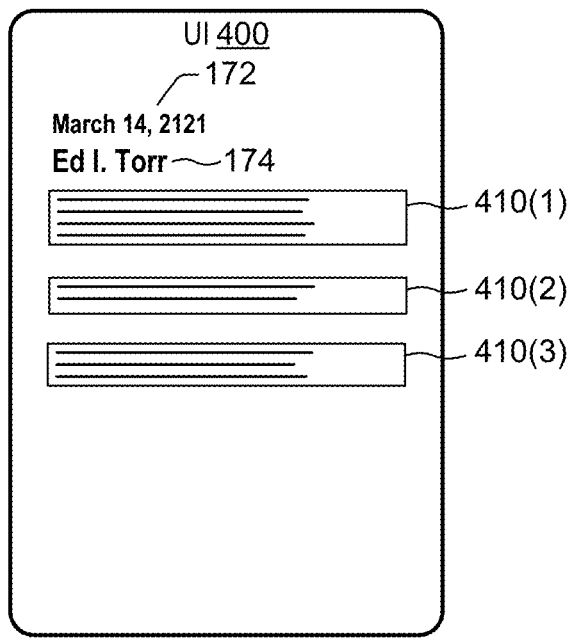
FIG. 4 illustrates an example of a user interface (UI) that presents aspects of a revision to an electronic document, in accordance with one or more embodiments of the disclosure.

Because the revision summarizer system 150 can generate a ranking of several summaries of changes to a shared document, a user device of the multiple user devices 102 can present a user interface 400 (FIG. 4) that includes multiple visual elements identifying respective summaries of changes to the shared document. The user device can be the user device 106 (FIG. 1) in some cases. The respective summaries can have placements within the ranking down to a defined position in the ranking relative to top place. For instance, the defined position can be third place, fourth place, fifth place, or similar placement. As is shown in the user interface 400, the defined position in the ranking can be third place. Thus, the multiple visual elements shown in the user interface 400 include a visual element 410(1) corresponding to the summary in top place within the ranking, a second visual element 410(2) corresponding to the summary in second place within the ranking, and a third visual element 410(3) corresponding to the summary in third place within the ranking.

Figure 5:
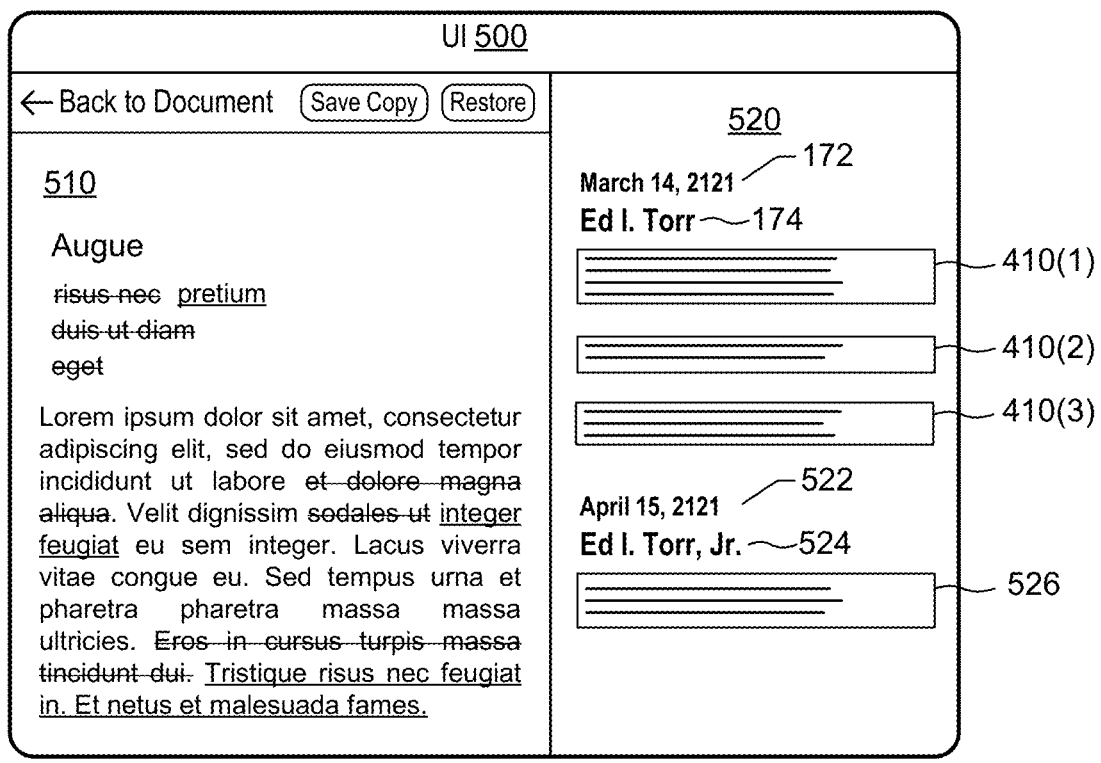
FIG. 5 illustrates another example of a user interface that presents aspects of a revision to an electronic document, in accordance with one or more embodiments of the disclosure.

In some embodiments a user device (e.g., the user device 106) of the multiple user devices 102 can present a user interface 500 (FIG. 5) that includes a first pane 510 that can present at least a portion of a section that has changed in a version of a shared document. Presenting the portion of that section can include presenting at least one first marking representing a first change of changes made to the shared document, and at least one second marking representing a second change of the changes. As mentioned, the changes can include addition of text, deletion of text, addition of an image, deletion of an image, a punctuation change, a format change, a combination of the foregoing, or similar. It is noted that Lorem Ipsum text is used in FIG. 5 simply as an illustration of the content being presented in the first pane 510.

The section that has changed and the associated changes shown in the pane 510 can correspond to a revision summary that is shown in a second pane 520 of the user interface 500. For example, the section can correspond to one of the top-place summary represented by the visual element 410(1), the second-place summary represented by the second visual element 410(2), or the third-place represented by the third visual element 410(3). In some embodiments, the content that is shown in the first pane 510 can correspond to the top-place summary until an interaction with the UI 500 is detected. To that point, the visual elements 410(1) to 410(3) can be selectable and the content shown in the first pane 510 can be responsive to selection of one of those selectable visual elements. Selection can be accomplished by an interaction with the selectable visual element. The interaction can include one of a mouse click, a mouse hover, a screen swipe, a screen tap, screen touch for a defined time interval, a gesture, or similar activity. It is noted that more or fewer than three visual elements corresponding to summaries can be presented in the second pane 520. In some cases, only the visual element 410(1) can be presented.

Because the revision summarizer system 150 can generate summaries of changes made to a shared document over time, the second pane 520 can present historical summaries. As such, the second pane 520 also can include one or many other groups of visual elements summarizing other changes made to the shared document. For example, the second pane 520 also can include a visual element 522 identifying a timestamp, and a visual element 524 identifying a username of an author of a change. The second pane 520 also can include a visual element 526 identifying a top-place summary, for example. The second pane 520 can represent a version history for the shared document.

For purposes of further illustration of a version history in accordance with aspects of this disclosure, FIG. 6 presents a fragment of user interface that includes a pane 610 having several groups of visual elements summarizing changes made to the shared document. Although a specific layout of the visual elements is shown in FIG. 6, the disclosure is not limited in that respect. Other layouts and formats can be used to present a version history.

Figure 7:
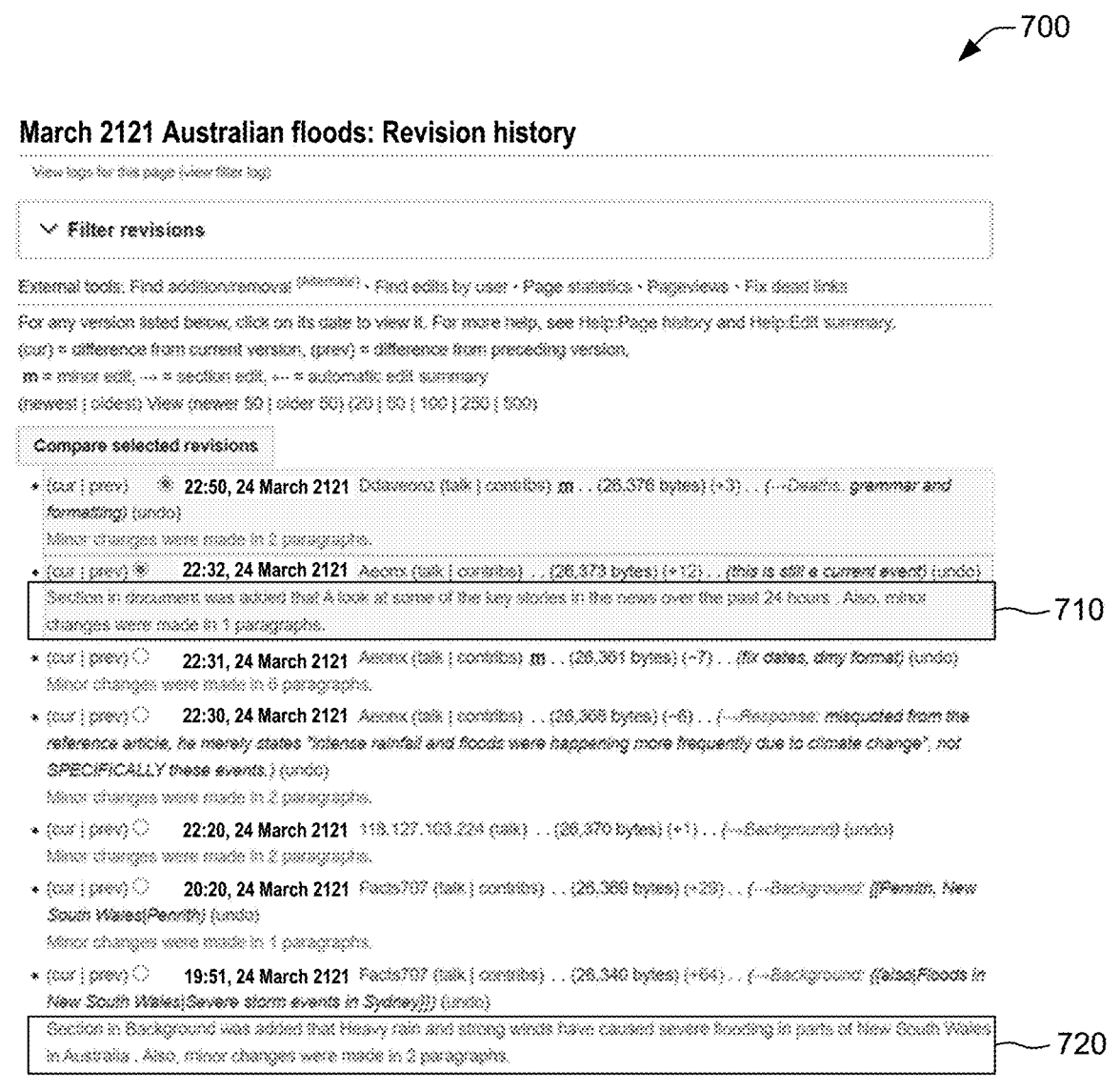

FIG. 7 illustrates an example of a user interface 700 that conveys historical changes that have been made to a shared document, in accordance with one or more embodiments of the disclosure. The revision summarizer system 150 (FIG. 1) can generate respective revision summaries for one or many of the revisions, and can add metadata to respective versions of the document. The added metadata can cause the presentation of visual elements corresponding to the respective revision summaries. As such, a user device can present the user interface 700, where presenting the user interface 700 can include presenting a visual element 710 identifying a first summary of changes and a visual element 720 identifying a second summary of changes. The first and second summary of changes can be top-placed summaries for respective revisions of the shared document.

In some cases, a shared document can include content that defines a webpage. In those cases, the revision summarizer system 150 can generate a summary of changes to the webpage relative to the webpage as it existed during a prior visit to the webpage. The revision summarizer system 150 can generate the changes in accordance with aspects described herein. A user device can present a user interface including the summary in response to an interaction with a hyperlink representing a resource location of the webpage. Such an interaction can include one of a mouse click, a mouse hover, a screen swipe, a screen tap, screen touch for a defined time interval, a gesture, or similar activity. For example, the user device (e.g., user device 106 (FIG. 1)) can display the hyperlink in a web browser or on a section of an electronic document. In response to the interaction with the hyperlink, the user device can present a user interface that includes a visual element identifying the summary of changes to the webpage. In some embodiments, the user interface also can include at least one first marking representing a first change of the changes to the webpage and at least one second marking representing a second change of the changes to the webpage.

Figure 8:
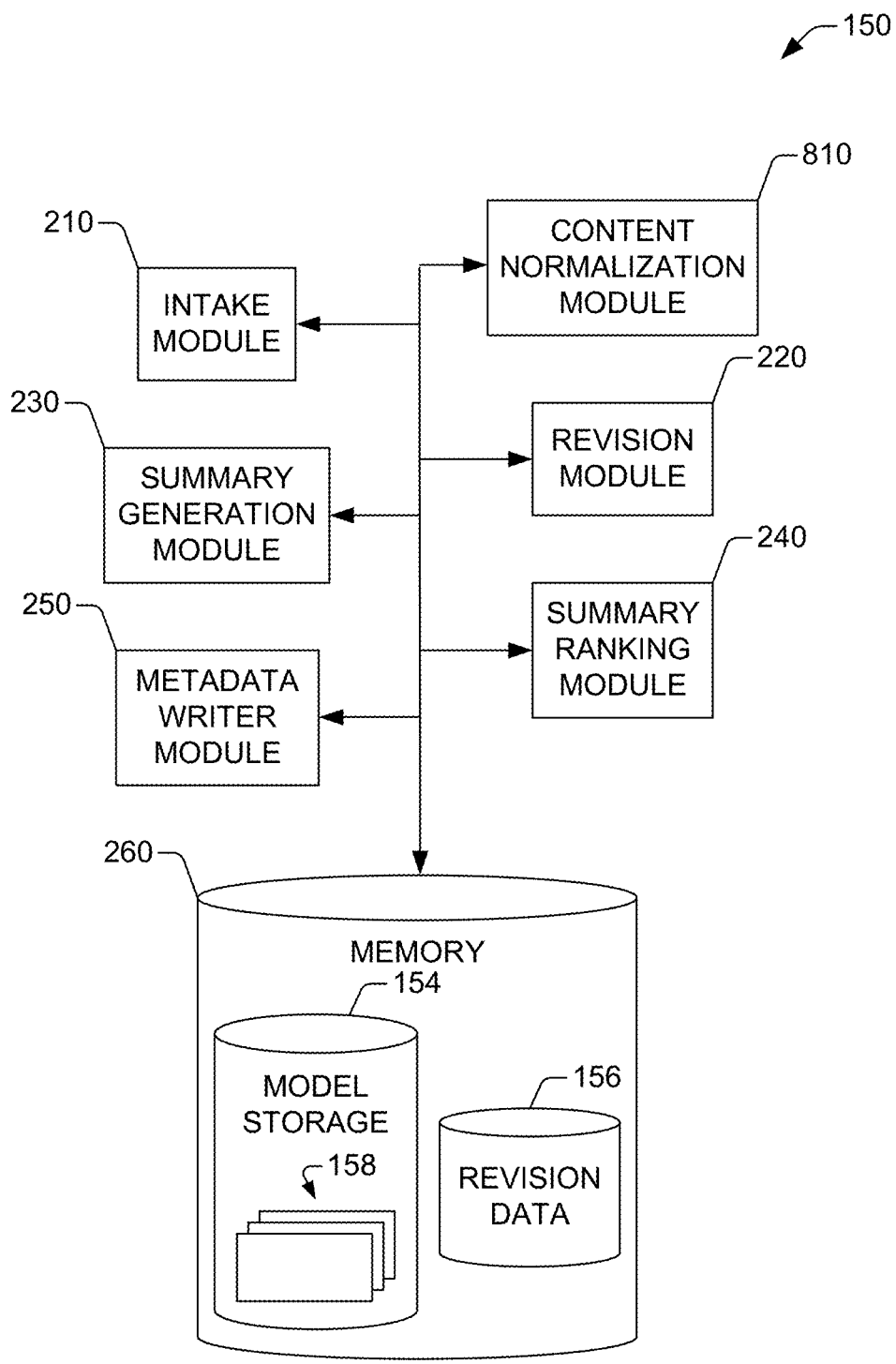
FIG. 8 illustrates another example of a revision summarizer system for automated generation of revision summaries, in accordance with one or more embodiments of the disclosure.

To generate a summary of changes to the webpage, in some embodiments, the intake module 210 can obtain a current version of the webpage that is contemporaneous with selection of the hyperlink to access the webpage. The revision summarizer system 150 also can include a content normalization module 810 (FIG. 8) that can normalize content of the current version of the webpage by removing defined types of digital content from the webpage. In some cases, the content normalization module 810 can remove sidebars, toolbars, and/or banners, generating a first electronic document corresponding to the current version of the webpage. That first electronic document can contain a current version of the main content of the webpage.

In addition, the intake module 210 also can obtain a cached version of the webpage corresponding to a prior time the webpage was accessed. The revision summarizer system 150 can normalize, via the content normalization module

810, content of the cached version of the webpage by removing defined types of digital content from the webpage. Again, in some cases, the content normalization module 810 can remove sidebars, toolbars, and/or banners, generating a second electronic document corresponding to the cached version of the webpage. That second electronic document can contain a version of the main content of the cached webpage.

The revision summarizer system 150 can then generate one or several summaries of changes present in the first electronic document relative to the second electronic document. To that end, the revision summarizer system 150 can apply the procedural pipeline including the operation stages described herein.

The revision summarizer system 150 (see FIG. 2, for example) also can generate summaries of changes originating from code updates. In such cases, the revision summarizer system 150 can operate on shared documents containing particular source code, without operating on binary files and/or data files. After the intake module 210 has obtained a current version and a prior version of the shared document containing source code, the revision summarizer system 150 can apply the procedural pipeline including the operation stages described herein, to generate summaries of changes present in the current version of the shared document relative to the prior version of the shared document.

Figure 9:
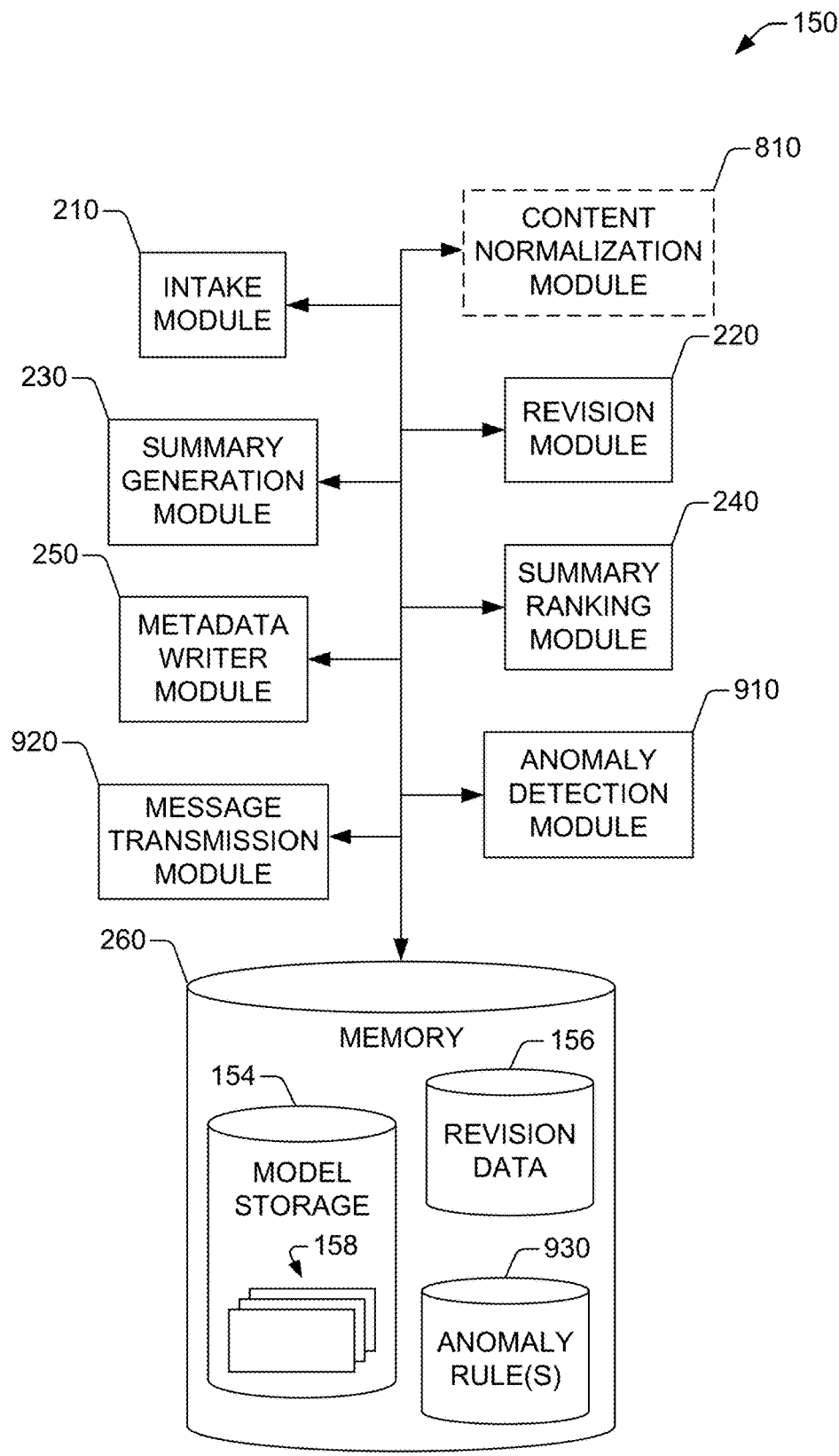
FIG. 9 illustrates another example of a revision summarizer system for automated generation of revision summaries, in accordance with one or more embodiments of the disclosure.

There may be situations where a change to a shared document is made accidentally or maliciously. In either case the change is unintended and, thus, having access to the change and/or an indication that an unintended change occurred can at least mitigate the use of computing resources on the shared document. In some embodiments, as is shown in FIG. 9, the revision summarizer system 150 can include, or can be functionally coupled to, an anomaly detection module 910 that can determine presence of an unintended change to a shared document. To that point, the anomaly detection module 910 can access a change to the shared document and can determine if the change satisfies one or more anomaly rules. An anomaly rule can define one or many conditions that, individually or collectively, indicate presence of an anomalous change. The anomaly rule is satisfied when the defined condition(s) can be satisfied. The anomaly rule(s) can be retained in one or several memory devices 930 (referred to as anomaly rule(s) 930).

An example of an unintended change can be the addition of, or revision of text to, a known offensive word. Accordingly, an example of a condition defined by one or more anomaly rules is presence of text in a list (which can be referred to as a black list) or another type of data structure that contains one or more offensive word. For purposes of illustration, an offensive word refers to a term that pejoratively portrays a person, a group of persons, an institution, or another entity, for example. An offensive term also can include custom terms defined by a particular entity (such as a government office, a religious group, a club, or similar).

Another example of a condition defined by one or more anomaly rules is an anomaly score being greater than a threshold value, where the anomaly detection module 910 can generate the anomaly score using a machine-learning model trained on previous anomalous changes to a document (shared or otherwise). To that end, the anomaly detection module 910 can apply such a machine-learning model to one or more passages of a version of a shared document.

Additional examples of unintended changes include changes which result in the creation of invalid words (e.g., accidental insertion or unintended deletion) and atomic changes, especially by users not originally involved in authoring the document. An atomic change refers to a single edit, as opposed to multiple edits.

In response to a determination that a change satisfies an anomaly rule—that is, detection of an anomalous change—the revision summarizer system 150 can cause a user device (e.g., user device 106) to update a user interface to include a visual element identifying the change as an anomalous change. To that end, the revision summarizer system 150 can include a message transmission module 920 that can send a message to the user device. The message can include formatting information defining the visual element to be included in the user interface and/or placement of the visual element in the user interface. In addition, or in other embodiments, the message transmission module 920 can send a message to a communication address of an administrator account of an administrator of the shared document. The administrator account, including the communication address in some cases, can be configured at the time of creating the shared document. The communication address can be embodied in, for example, an email address, a social media handle, a telephone number, or similar.

Further, or in yet other embodiments, in response to detection of an anomalous change, the metadata writer module 250 can add exception data to metadata pertaining to a current version of the electronic document. To that end, in some cases, the metadata writer module 250 can add the exception data to the data 160. The exception data can include first data identifying (e.g., flagging) the change that satisfies the anomaly rule as an anomalous change.

Figure 10:
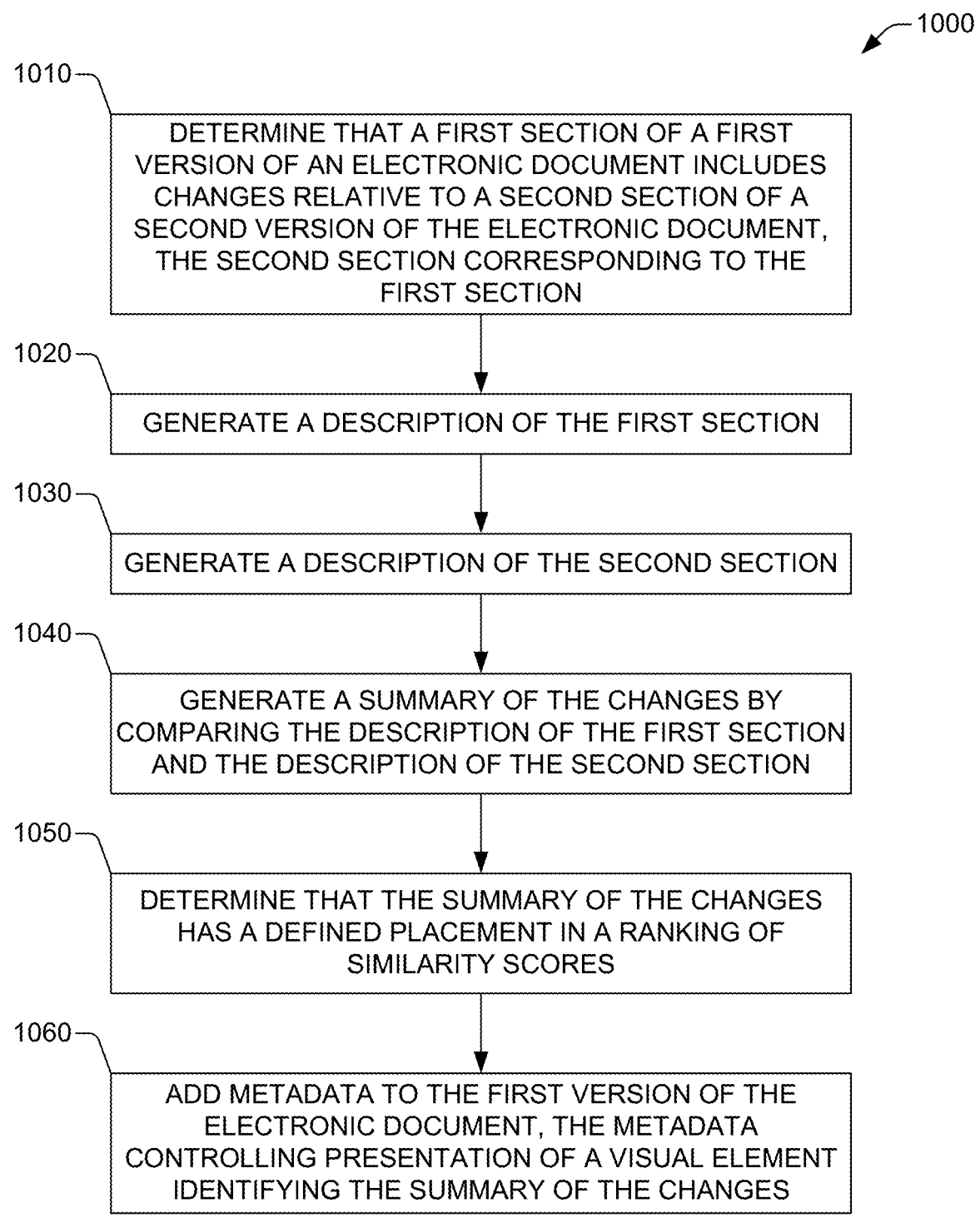
FIG. 10 illustrates an example of a method for summarizing changes to an electronic document, in accordance with one or more embodiments of this disclosure.
Figure 11:
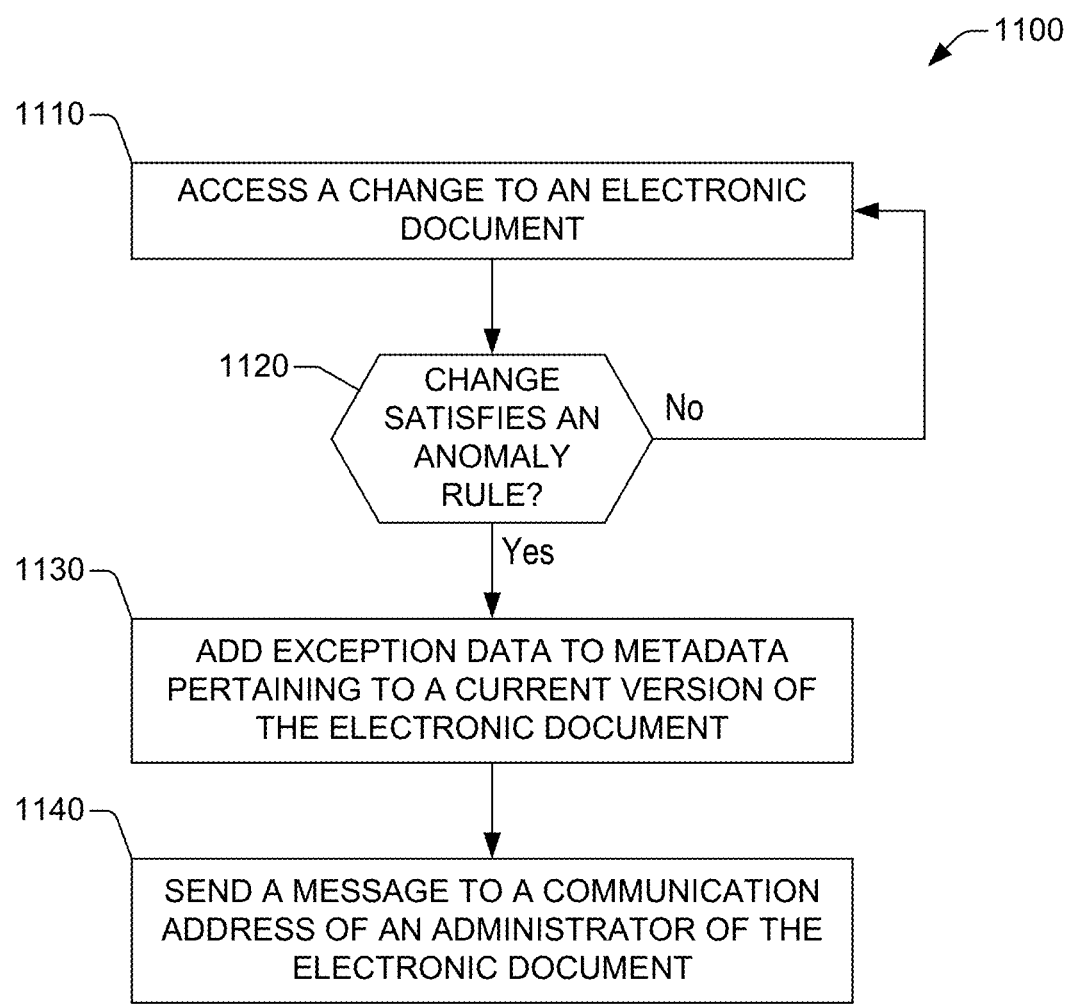
FIG. 11 illustrates an example of a method for handling an anomalous revision to an electronic document, in accordance with one or more embodiments of this disclosure.

Examples of techniques that may be implemented in accordance with the subject matter disclosed herein can be better appreciated with reference to the flowcharts in FIG. 10 and FIG. 11. For purposes of simplicity of explanation, the example techniques are shown and described as a series of blocks. The disclosure, however, is not limited by the number or order of the blocks and related operations, as some blocks may occur in different orders and/or concurrently with other blocks from what is depicted and described in connection with those flowcharts. Moreover, not all illustrated blocks and related operations may be required to implement the example techniques described hereinafter. It is to be appreciated that the functionality associated with the blocks may be implemented by software executing on a computing device, hardware, a combination of software and hardware, or any other suitable computer-executable instructions and processing circuitry. Further, the example techniques described hereinafter and throughout this specification are capable of being stored on an article of manufacture to transport and transfer such techniques to various computing devices for implementation of the techniques.

FIG. 10 illustrates an example of a method for summarizing changes to an electronic document, in accordance with one or more embodiments of this disclosure. A computing system can implement, entirely or partially, the example method 1000. The computing system includes, or is functionally coupled to, one or more processors, one or more memory devices, other types of computing resources, a combination thereof, or the like. Such processor(s), memory device(s), computing resource(s), individually or in a particular combination, permit or otherwise facilitate implementing the example method 1000. The computing resources can include operating systems (O/Ss); software for configuration and/or control of a virtualized environment; firmware; central processing unit(s) (CPU(s)); graphics processing unit(s) (GPU(s)); virtual memory; disk space; downstream bandwidth and/or upstream bandwidth; interface(s) (I/O interface devices, programming interface(s) (such as application programming interfaces (APIs), etc.); controller devices(s); power supplies; a combination of the foregoing; or similar. In some embodiments, the computing system can embody, or can constitute, the revision summarizer system 150.

At block 1010, the computing system can determine that a first section of a first version of an electronic document includes changes relative to a second section of a second version of the electronic document. The second section corresponds to the first section. The electronic document can be authored by multiple user devices (e.g., the multiple user devices 102 (FIG. 1)) concurrently or non-concurrently. In some embodiments, the computing system can execute, or can continue executing, a component (e.g., revision module 220 (FIG. 2)) to perform such a determination. Such a component can be included in, or functionally coupled to, the computing system.

At block 1020, the computing system can generate a description of the first section. The computing system can generate that description by applying a machine-learning model to first text in the first section.

At block 1030, the computing system can generate a description of the second section. The computing system can generate that description by applying the machine-learning model to text in the second section.

At block 1040, the computing system can generate a summary of the changes by comparing the description of the first section and the description of the second section. In some embodiments, the computing system can execute, or can continue executing, a component (e.g., summary generation module 230 (FIG. 2)) to generate the summary of the changes. Such a component can be included in, or functionally coupled to, the computing system.

At block 1050, the computing system can determine that the summary of the changes has a defined placement in a ranking of similarity scores. In some embodiments, the computing system can execute, or can continue executing, a component (e.g., summary ranking module 240 (FIG. 2)) that performs such a determination. Such a component can be included in, or functionally coupled to, the computing system.

At block 1060, the computing system can add metadata to the first version of the electronic document. The metadata controls the presentation of a visual element identifying the summary of the changes. In some embodiments, the computing system can execute, or can continue executing, a component (e.g., the metadata writer module 250 (FIG. 2)) to add the metadata to the first version of the electronic document. Such a component can be included in, or functionally coupled to, the computing system.

FIG. 11 illustrates an example of a method 1100 for handling an anomalous revision to an electronic document, in accordance with one or more embodiments of this disclosure. A computing system can implement, entirely or partially, the example method 1100. The computing system includes, or is functionally coupled to, one or more processors, one or more memory devices, other types of computing resources, a combination thereof, or similar. Such processor(s), memory device(s), computing resource(s), individually or in a particular combination, permit or otherwise facilitate implementing the example method 1100. The computing resources can include O/Ss; software for configuration and/or control of a virtualized environment; firmware; CPU(s); GPU(s); virtual memory; disk space; downstream bandwidth and/or upstream bandwidth; interface(s) (I/O interface devices, programming interface(s) (such as APIs, etc.); controller devices(s); power supplies; a combination of the foregoing; or similar. In some cases, the computing system the implements that example method 1000 also can implement the example method 1100. In some embodiments, the computing system can embody, or can constitute, the revision summarizer system 150.

At block 1110, the computing system can access a change to an electronic document. The electronic document can be authored by multiple user devices concurrently or in a sequence of asynchronous editing events. In one example, the multiple user devices can include the user devices 102 (FIG. 1)). The computing system can access the change in numerous ways. In one embodiment, the computing system can receive data defining a change as the change becomes available. The data can be received from a module that can be included in the computing system or can be functionally coupled thereto. Such a module can be embodied in the revision module 220 (FIG. 2) in some cases.

At block 1120, the computing system can determine if the change satisfies an anomaly rule. To that end, in some embodiments, the computing system can execute a component (e.g., the anomaly detection module 910 (FIG. 9)) that can detect an anomalous revision to a document (shared or otherwise). In response to a negative determination ("No" branch), flow of the example method 1100 can return to block 1110. In the alternative, in response to ascertaining that the change satisfies one or several anomaly rules including the anomaly rule ("Yes" branch), flow of the example method 1100 can continue to block 1130.

At block 1130, the computing system can add exception data to metadata pertaining to a current version of the electronic document. The exception data can include first data identifying (e.g., flagging) the change as being an anomalous change. In some embodiments, the computing system can add the first data to a revision summary corresponding to the change. In some embodiments, the computing system can execute a component (e.g., the metadata writer module 250 (FIG. 2)) to add the exception data to the metadata.

At block 1140, the computing system can send a message to a communication address of an administrator account of an administrator of the electronic document. The communication address can be embodied in an email address, a social media handle, a telephone number, or similar. The message can include the exception data, in some cases. In addition, or in some cases, the message can include payload data identifying the electronic document and/or other payload data identifying an author of the change. For instance, the message can include a filename of the electronic document and a username that authored the change. In some embodiments, the computing system can execute a component (e.g., the message transmission module 920 (FIG. 9)) to send such a message to the communication address.

Other methods can be implemented. An example of those methods can combine the operations in the example method 1000 (FIG. 10) and/or the operations in the example method 1100 (FIG. 11) with operations performed at a user device. For instance, such an example method can include causing a display device of a user device to present the user interface, presenting the user interface comprises presenting the visual element. The user interface can include a first pane, and presenting the user interface also can include presenting a portion of a section of a shared document on the first pane. Presenting the portion of that section can include presenting at least one first marking representing a first change of changes made to the shared document, and also presented at least one second marking representing a second change of the changes.

Figure 12:
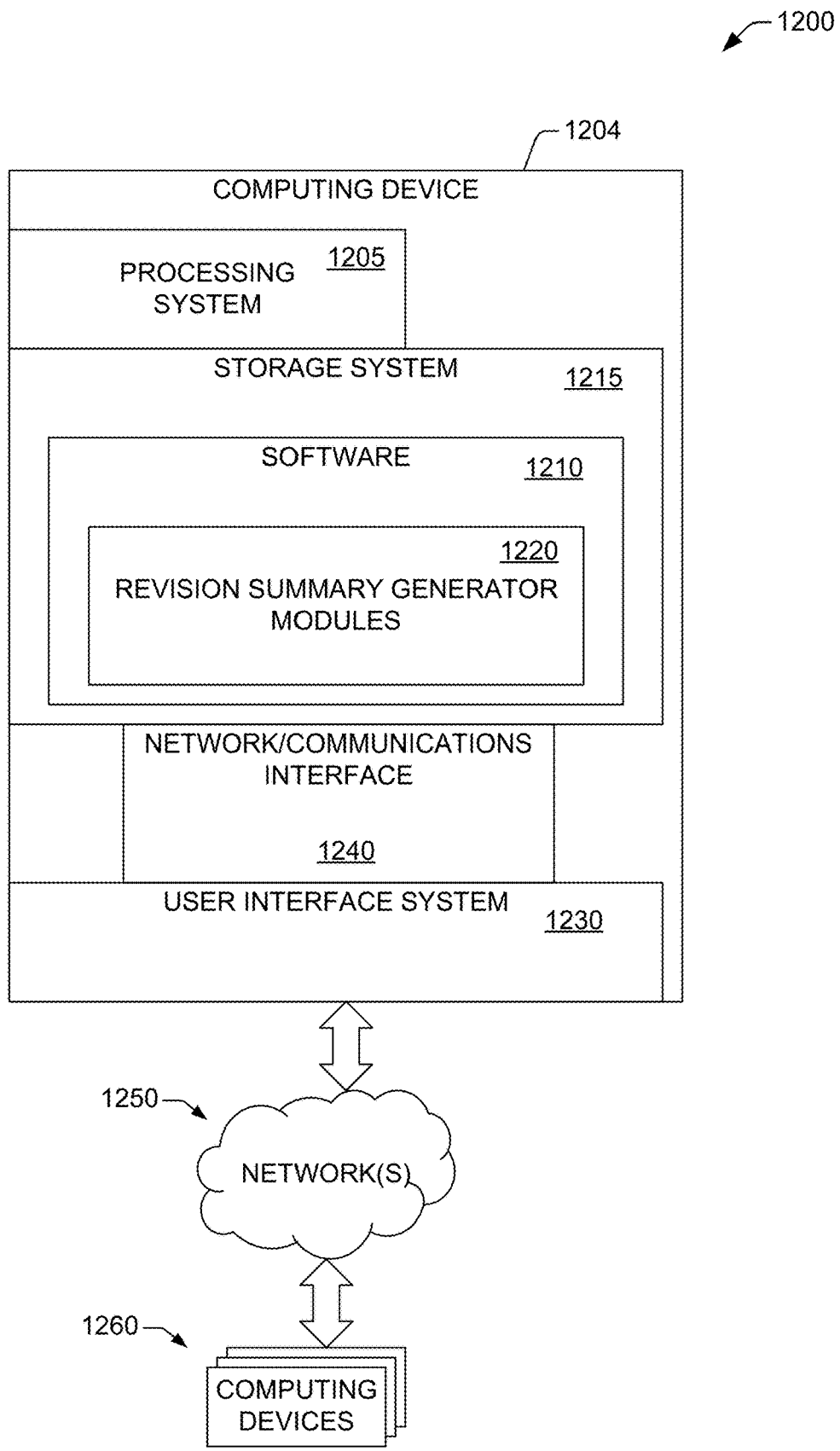
FIG. 12 illustrates an example of a computing environment in which automated generation of revision summaries can be implemented in accordance with one or more embodiments of the disclosure.

FIG. 12 illustrates an example of a computing environment 1200 that may carry out the described processes, in accordance with one or more embodiments of this disclosure. The computing environment 1200 may represent a computing system that includes a computing device 1204, such as a personal computer, a reader, a mobile device, a personal digital assistant, a wearable computer, a smart phone, a tablet, a laptop computer (notebook or netbook, for example), a gaming device or console, an entertainment device, a hybrid computer, a desktop computer, a smart television, or an electronic whiteboard or large form-factor touchscreen. Accordingly, more or fewer elements described with respect to the computing device 1204 can be incorporated to implement a particular computing device. The computing system also can include one or many computing devices 1260 remotely located relative to the computing device 1204. A communication architecture including one or more networks 1250 can functionally couple the computing device 1204 and the remote computing device(s) 1260.

The computing device 1204 includes a processing system 1205 having one or more processors (not depicted) to transform or manipulate data according to the instructions of software 1210 stored on a storage system 1215. Examples of processors of the processing system 1205 include general purpose central processing units (CPUs), graphics processing units (GPUs), field programmable gate arrays (FPGAs), application specific processors, and logic devices, as well as any other type of processing device, combinations, or variations thereof. The processing system 1205 can be embodied in, or included in, a system-on-chip (SoC) along with one or more other components such as network connectivity components, sensors, video display components.

The software 1210 can include an operating system and application programs. The software 1210 also can include functionality instructions. The functionality instructions can include computer-accessible instructions that, in response to execution (by at least one of the processor(s) included in the processing system 1205), can implement one or more of the automated revision summary generation described in this disclosure. The computer-accessible instructions can be both computer-readable and computer-executable, and can embody or can include one or more software components illustrated as revision summary generator modules 1220. The modules 1220 can include a combination of the various modules described herein in connection with the revision summarizer system 150.

In one scenario, execution of at least one software component of the revision summary generator modules 1220 can implement one or more of the methods disclosed herein, such as the example methods 1000 and 1100. For instance, such execution can cause a processor (e.g., one of the processor(s) included in the processing system 1205) that executes the at least one software component to carry out a disclosed example method or another technique of this disclosure.

Device operating systems generally control and coordinate the functions of the various components in the computing device 1204, providing an easier way for applications to connect with lower-level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It is noted that the O/S can be implemented both natively on the computing device 1204 and on software virtualization layers running atop the native device O/S. Virtualized O/S layers, while not depicted in FIG. 12, can be thought of as additional, nested groupings within the operating system space, each containing an O/S, application programs, and APIs.

Storage system 1215 can include any computer readable storage media readable by the processing system 1205 and capable of storing the software 1210 including the revision summary generator modules 1220.

Storage system 1215 may include volatile and nonvolatile memories, removable and non-removable media implemented in any method or technology for storage of information, such as computer readable instructions, data structures, program modules, or other data. Examples of storage media of storage system 1215 include random access memory, read only memory, magnetic disks, optical disks, CDs, DVDs, flash memory, magnetic cassettes, magnetic tape, magnetic disk storage or other magnetic storage devices, or any other suitable storage media. In no case do the terms "storage media" or "storage medium" consist of carrier waves or transitory, propagating signals.

Storage system 1215 may be implemented as a single storage device but may also be implemented across multiple storage devices or sub-systems co-located or distributed relative to each other. Storage system 1215 may include additional elements, such as a controller, capable of communicating with processing system 1205.

The computing device 1204 also can include user interface system 1230, which may include I/O devices and components that enable communication between a user and the computing device 1204. User interface system 1230 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 1230 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

A natural user interface (NUI) may be included as part of the user interface system 1230 for a user (such as user of one of the multiple user devices 102 (FIG. 1)) to input feature selections. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on the display (not shown) in myriad ways, presenting graphical user interface elements, text, images, video, notifications, virtual buttons, virtual keyboards, or any other type of information capable of being depicted in visual form.

The user interface system 1230 also can include user interface software and associated software (e.g., for graphics chips and input devices) executed by the O/S in support of the various user input and output devices. The associated software assists the O/S in communicating user interface hardware events to application programs using defined mechanisms. The user interface system 1230 including user interface software may support a graphical user interface, a natural user interface, or any other type of user interface.

Network interface 1240 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods, and processes included within the hardware modules.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system, comprising:
   at least one processor;
   at least one memory device having instructions encoded thereon that, in response to execution by the at least one processor, cause the system to:
   determine that a first section of a first version of an electronic document includes changes relative to a second section of a second version of the electronic document, the second section corresponding to the first section;
   generate a description of the first section by applying a machine-learning model to first text in the first section;
   generate a description of the second section by applying the machine-learning model to second text in the second section;
   generate a summary of the changes by comparing the description of the first section and the description of the second section;
   determine that the summary of the changes has a defined placement in a ranking of similarity scores, a first similarity score in the ranking defines similarity between the description of the first section and the description of the second section; and
   add metadata to the first version of the electronic document, the metadata controlling presentation of a visual element identifying the summary of the changes within a user interface.

2. The system of claim 1, further comprising a user device that presents the user interface, wherein presenting the user interface comprises presenting the visual element.

3. The system of claim 2, wherein the user interface further comprises a first pane, and wherein the presenting the user interface comprises presenting a portion of the second section on the first pane, the presenting the portion of the second section comprises presenting at least one first marking representing a first change of the changes and at least one second marking representing a second change of the changes.

4. The system of claim 1, wherein determining that the first section of the first version of the electronic document includes the changes relative to the second section of the second version of the electronic document comprises:
   identifying the first section;
   matching the first section to the second section; and
   determining differences between text in the first section and second text in the second section, the differences including the changes.

5. The system of claim 4, wherein identifying the first section comprises:
   determining a content type of a portion of the first version of the electronic document by applying a second machine-learning model to the electronic document, the determining the content type including generating a first tag identifying the content type;
   assigning the first tag to a section name of the first section; and
   assigning the portion of the electronic document to the first section.

6. The system of claim 5, wherein matching the first section to the second section comprises determining that a second tag defining a section name of the second section is equal to the first tag.

7. The system of claim 1, the at least one memory device having further instructions encoded thereon that, in response to execution by the at least one processor, further cause the system to generate the ranking of similarity scores.

8. The system of claim 1, the at least one memory device having further instructions encoded thereon that, in response to execution by the at least one processor, further cause the system to determine the first similarity score by evaluating a similarity function including one of cosine similarity, Minkowski similarity, Manhattan similarity, or Jaccard similarity.

9. The system of claim 1, the at least one memory device having further instructions encoded thereon that, in response to execution by the at least one processor, further cause the system to:
   determine that at least one of the changes satisfies an anomaly criterion; and
   update the user interface to include a second visual element identifying the at least one change as an anomalous change.

10. The system of claim 1, wherein the electronic document comprises content being edited across multiple user devices.

11. The system of claim 1, wherein the changes comprise at least one of addition of text, deletion of text, addition of an image, deletion of an image, a punctuation change, or a format change.

12. A computer-implemented method, comprising:
- determining, by a computing system comprising at least one processor, that a first section of a first version of an electronic document includes changes relative to a second section of a second version of the electronic document, the second section corresponding to the first section;
- generating, by the computing system, a description of the first section by applying a machine-learning model to first text in the first section;
- generating, by the computing system, a description of the second section by applying the machine-learning model to second text in the second section;
- generating, by the computing system, a summary of the changes by comparing the description of the first section and the description of the second section;
- determining, by the computing system, that the summary of the changes has a defined placement in a ranking of similarity scores, a first similarity score in the ranking defines similarity between the description of the first section and the description of the second section is equal to or greater than a threshold; and
- adding metadata to the first version of the electronic document, the metadata controlling presentation of a visual element identifying the summary of the changes within a user interface.

13. The computer-implemented method of claim 12, further comprising causing a display device of a user device to present the user interface, presenting the user interface comprises presenting the visual element.

14. The computer-implemented method of claim 13 wherein the user interface further comprises a first pane, and wherein presenting the user interface further comprises presenting a portion of the second section on the first pane, the presenting the portion of the second section comprises presenting at least one first marking representing a first change of the changes and at least one second marking representing a second change of the changes.

15. The computer-implemented method of claim 12, wherein the determining that the first section of the first version of the electronic document includes the changes relative to the second section of the second version of the electronic document comprises:
- identifying the first section;
- matching the first section to the second section; and
- determining differences between text in the first section and second text in the second section, the differences including the changes.

16. The computer-implemented method of claim 15, wherein the identifying the first section comprises:
- determining a content type of a portion of the first version of the electronic document by applying a second machine-learning model to the electronic document, the determining the content type including generating a first tag identifying the content type;
- assigning the first tag to a section name of the first section; and
- assigning the portion of the electronic document to the first section.

17. The computer-implemented method of claim 16, wherein the matching the first section to the second section comprises determining that a second tag defining a section name of the second section is equal to the first tag.

18. At least one computer-readable storage medium having instructions encoded thereon that, in response to execution, cause a computing system to perform or facilitate operations comprising:
- determining that a first section of a first version of an electronic document includes changes relative to a second section of a second version of the electronic document, the second section corresponding to the first section;
- generating a description of the first section by applying a machine-learning model to first text in the first section;
- generating a description of the second section by applying the machine-learning model to second text in the second section;
- generating a summary of the changes by comparing the description of the first section and the description of the second section;
- determining that the summary of the changes has a defined placement in a ranking of similarity scores, a first similarity score in the ranking defines similarity between the description of the first section and the description of the second section is equal to or greater than a threshold; and
- adding metadata to the first version of the electronic document, the metadata controlling presentation of a visual element identifying the summary of the changes.

19. The at least one computer-readable storage medium of claim 18, wherein the determining that the first section of the first version of the electronic document includes the changes relative to the second section of the second version of the electronic document comprises,
- identifying the first section;
- matching the first section to the second section; and
- determining differences between text in the first section and second text in the second section, the differences including the changes.

20. The at least one computer-readable storage medium of claim 19, wherein the identifying the first section comprises,
- determining a content type of a portion of the first version of the electronic document by applying a second machine-learning model to the electronic document, the determining the content type including generating a first tag identifying the content type;
- assigning the first tag to a section name of the first section; and
- assigning the portion of the electronic document to the first section.

* * * * *